United States Patent
Jaroensri et al.

(10) Patent No.: US 10,725,637 B2
(45) Date of Patent: Jul. 28, 2020

(54) SYSTEMS AND METHODS FOR PROVIDING IMAGE PERSPECTIVE ADJUSTMENT AND AUTOMATIC FITTING

(71) Applicant: Facebook, Inc., Menlo Park, CA (US)

(72) Inventors: Ronnachai Jaroensri, Cambridge, MA (US); Li Tan, Fremont, CA (US); John Pottebaum, San Francisco, CA (US); Christopher James Connolly, San Francisco, CA (US); John Samuel Barnett, Newark, CA (US); Udeepta Dutta Bordoloi, Foster City, CA (US); Georges Edouard Maurice Berenger, Menlo Park, CA (US); Alex Restrepo, San Francisco, CA (US); Alexandre Karpenko, Palo Alto, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 16/252,327

(22) Filed: Jan. 18, 2019

(65) Prior Publication Data
US 2019/0155490 A1    May 23, 2019

Related U.S. Application Data

(63) Continuation of application No. 16/215,501, filed on Dec. 10, 2018, now Pat. No. 10,310,721, which is a (Continued)

(51) Int. Cl.
*G06T 3/20* (2006.01)
*G06T 3/40* (2006.01)
(Continued)

(52) U.S. Cl.
CPC ........ *G06F 3/04845* (2013.01); *G06F 3/0488* (2013.01); *G06F 3/04815* (2013.01);
(Continued)

(58) Field of Classification Search
CPC .................................................. G06F 3/04845
See application file for complete search history.

(56) References Cited

U.S. PATENT DOCUMENTS 6,567,101 B1    5/2003   Thomas
6,956,587 B1   10/2005   Anson
(Continued)

OTHER PUBLICATIONS

Lee et al., "Automatic Upright Adjustment of Photographs", Jun. 2012, IEEE, pp. 877-884 (Year: 2012).*
(Continued)

*Primary Examiner* — Mark K Zimmerman
*Assistant Examiner* — Jonathan M Cofino
(74) *Attorney, Agent, or Firm* — Sheppard Mullin Richter & Hampton LLP

(57) ABSTRACT

Systems, methods, and non-transitory computer-readable media can provide one or more options to adjust, in a virtual three-dimensional space, an image in an initial perspective. At least a first command, provided based on the one or more options, to adjust the image from the initial perspective into an adjusted perspective can be detected. The image can be adjusted, based on at least the first command, into the adjusted perspective in the virtual three-dimensional space to produce an adjusted image. A second command to modify a viewable area of the adjusted image can be detected. At least a portion of the adjusted image can be automatically fitted, when the second command has ceased, within a specified display area while one or more empty regions can be minimized in the specified display area.

20 Claims, 16 Drawing Sheets

Related U.S. Application Data continuation of application No. 14/743,937, filed on Jun. 18, 2015, now abandoned.

(51) Int. Cl.
*G06T 3/60* (2006.01)
*G06F 3/0484* (2013.01)
*G06T 19/20* (2011.01)
*G06F 3/0488* (2013.01)
*G06F 3/0481* (2013.01)

(52) U.S. Cl.
CPC ............ *G06F 3/04883* (2013.01); *G06T 3/20* (2013.01); *G06T 3/40* (2013.01); *G06T 3/60* (2013.01); *G06T 19/20* (2013.01); *G06F 2203/04806* (2013.01); *G06T 2219/2016* (2013.01)

(56) References Cited

U.S. PATENT DOCUMENTS

| | | | |
|---|---|---|---|
| 2003/0197716 A1* | 10/2003 | Krueger | G06T 11/60 345/629 |
| 2004/0233222 A1 | 11/2004 | Lee | |
| 2006/0204125 A1* | 9/2006 | Kempf | H04N 9/3185 382/274 |
| 2007/0152984 A1 | 7/2007 | Ording | |
| 2009/0002391 A1 | 1/2009 | Williamson | |
| 2011/0043517 A1 | 2/2011 | Schneider | |
| 2012/0013613 A1 | 1/2012 | Vesely | |
| 2012/0114201 A1 | 5/2012 | Luisi | |
| 2012/0309520 A1 | 12/2012 | Evertt | |
| 2013/0328927 A1 | 12/2013 | Mount | |
| 2014/0282077 A1 | 9/2014 | Wilson | |
| 2015/0348237 A1* | 12/2015 | Chen | G06T 3/60 345/649 |
| 2016/0012160 A1 | 1/2016 | Mohacsi | |

OTHER PUBLICATIONS

Kirk, David, "Photoshop Tip: Quick Fit on Screen," Tech-Recipes, Sep. 14, 2007 [retrieved online at https://www.tech-recipes.com/rx/2590/photoshop_tip_quick_fit_on_screen/ on Dec. 10, 2018].

Lee, Hyunjoon et al., "Automatic Upright Adjustment of Photographs," 2012 IEEE Conference on Computer Vision and Pattern Recogniation, pp. 1-8, Jun. 2012.

* cited by examiner

SYSTEMS AND METHODS FOR PROVIDING IMAGE PERSPECTIVE ADJUSTMENT AND AUTOMATIC FITTING

CROSS-REFERENCE TO RELATED APPLICATIONS

This application is a continuation of U.S. patent application Ser. No. 16/215,501, filed Dec. 10, 2018 and entitled "Systems and Methods for Providing Image Perspective Adjustment and Automatic Fitting", which is a continuation of U.S. patent application Ser. No. 14/743,937, filed Jun. 18, 2015 and entitled "Systems and Methods for Providing Image Perspective Adjustment and Automatic Fitting", which are all incorporated herein by reference.

FIELD OF THE INVENTION

The present technology relates to the field of media processing. More particularly, the present technology relates to techniques for providing image perspective adjustment and automatic fitting.

BACKGROUND

Today, people often utilize computing devices (or systems) for a wide variety of purposes. Users can use their computing devices to, for example, interact with one another, create content, share information, and access information. In some instances, a user of a computing device can utilize a camera or other image sensor of the computing device (or system) to capture or record media content, such as images. In some cases, the user can utilize the computing device to access, save, or store such images.

In some instances, the user may desire to edit or modify an image that is captured or otherwise acquired via his or her computing device. However, conventional approaches can often times be inefficient and inconvenient. Due to these and other reasons, conventional approaches can create challenges for or reduce the overall user experience associated with utilizing computing devices (or systems) to edit or modify media content, such as images.

SUMMARY

Various embodiments of the present disclosure can include systems, methods, and non-transitory computer readable media configured to provide one or more options to adjust, in a virtual three-dimensional space, an image in an initial perspective. At least a first command, provided based on the one or more options, to adjust the image from the initial perspective into an adjusted perspective can be detected. The image can be adjusted, based on at least the first command, into the adjusted perspective in the virtual three-dimensional space to produce an adjusted image. A second command to modify a viewable area of the adjusted image can be detected. At least a portion of the adjusted image can be automatically fitted, when the second command has ceased, within a specified display area while one or more empty regions can be minimized in the specified display area.

In an embodiment, it can be determined that the second command causes the viewable area of the adjusted image to become a zoomed-out viewable area of the adjusted image. The zoomed-out viewable area of the adjusted image can be presented while the second command is detected. The zoomed-out viewable area can reveal the one or more empty regions in the specified display area. It can be detected that the second command has ceased. Automatically fitting at least the portion of the adjusted image can include zooming in the zoomed-out viewable area such that at least the portion of the adjusted image fills the specified display area and the one or more empty regions are eliminated in the specified display area.

In an embodiment, the second command can correspond to a touch gesture. The touch gesture can include a pinch gesture performed with respect to a touch display configured to present, at least in part, the specified display area.

In an embodiment, it can be determined that the second command causes the viewable area of the adjusted image to move in at least one of a horizontal direction or a vertical direction, thereby producing a resulting viewable area of the adjusted image. The resulting viewable area of the adjusted image can be presented while the second command is detected. The resulting viewable area can reveal the one or more empty regions in the specified display area. It can be detected that the second command has ceased. Automatically fitting at least the portion of the adjusted image can include moving the resulting viewable area such that at least the portion of the adjusted image fills the specified display area and the one or more empty regions are eliminated in the specified display area.

In an embodiment, the second command can correspond to at least one touch gesture out of a set of touch gestures. The set of touch gestures can include at least one of a finger dragging operation, a finger pulling operation, a finger sliding operation, a finger flicking operation, or a finger moving operation. The at least one touch gesture can be performed with respect to a touch display configured to present, at least in part, the specified display area.

In an embodiment, orientation data can be acquired from one or more orientation sensors associated with a computing system. The image can be acquired from a camera of the computing system. An orientation and a zoom factor of the image can be adjusted, based on the orientation data, to result in the image being in the initial perspective. The image in the initial perspective can be presented while the one or more empty regions can be minimized in the specified display area.

In an embodiment, an amount of rotation in a first direction incurred by the computing system with respect to a default position can be determined based on the orientation data. Adjusting the orientation can include rotating the image in a second direction based on the amount of rotation incurred by the computing system. The second direction can be clockwise relative to a depth axis in the virtual three-dimensional space when the first direction is counterclockwise relative to the depth axis. The second direction can be counterclockwise relative to the depth axis when the first direction is clockwise relative to the depth axis.

In an embodiment, the one or more options to adjust the image can include at least one of a first option to adjust the image with respect to a horizontal axis in the virtual three-dimensional space, a second option to adjust the image with respect to a vertical axis in the virtual three-dimensional space, or a third option to adjust the image with respect to a depth axis in the virtual three-dimensional space.

In an embodiment, a first amount of rotation with respect to the horizontal axis can be provided when the first command is directed to the first option, a second amount of rotation with respect to the vertical axis can be provided when the first command is directed to the second option, and/or a third amount of rotation with respect to the depth axis can be provided when the first command is directed to the third option.

In an embodiment, the image can be analyzed to detect one or more linear edges represented in the image. The one or more linear edges can be detected to be within an allowable deviation from being vertical. An orientation and a zoom factor of the image can be adjusted, based on the one or more linear edges, to result in the image being in the initial perspective.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
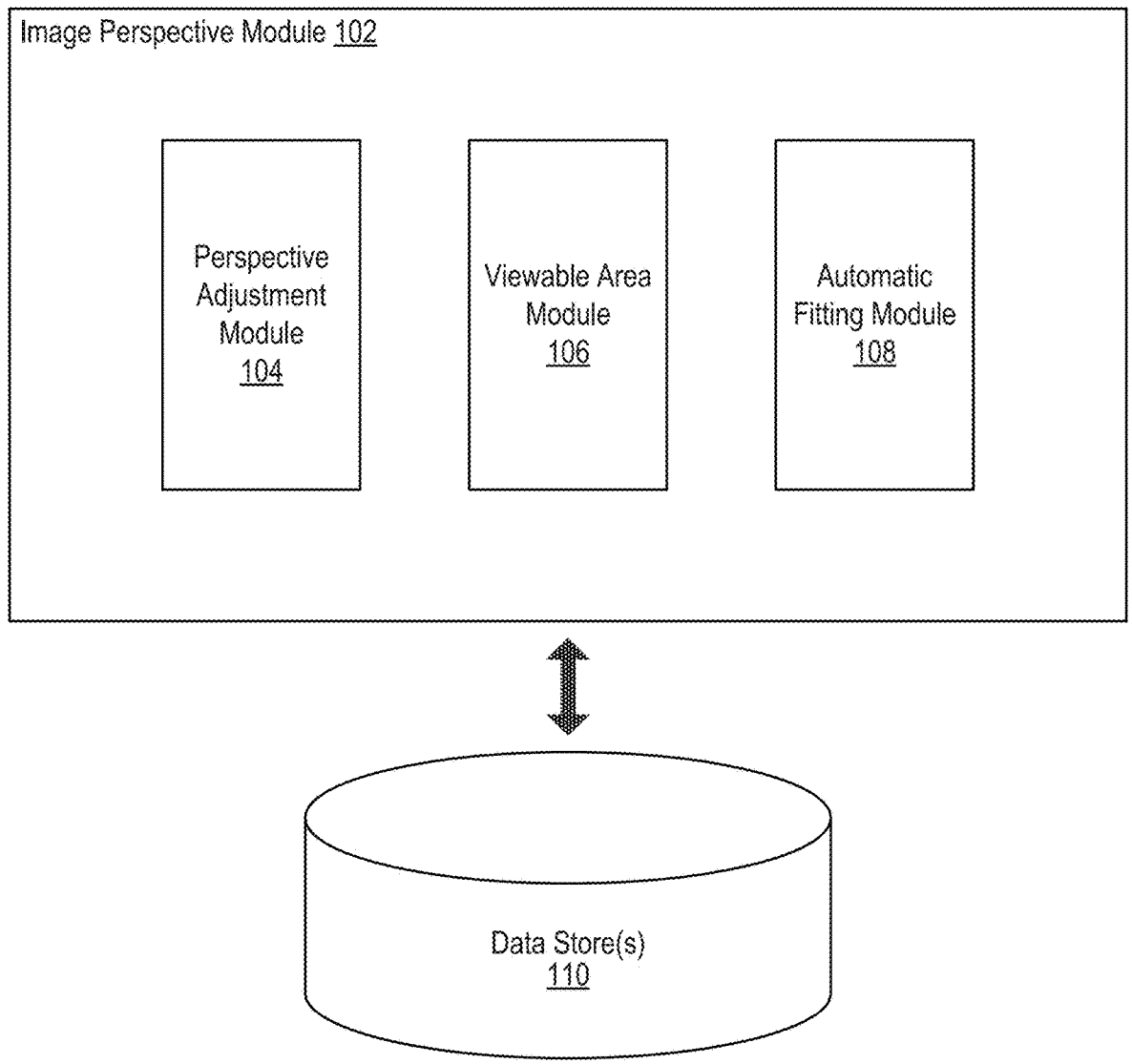
FIG. 1 illustrates an example system including an example image perspective module configured to facilitate providing image perspective adjustment and automatic fitting, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Image Perspective Adjustment and Automatic Fitting

People use computing devices (or systems) for a wide variety of purposes. Computing devices can provide different kinds of functionality. Users can utilize their computing devices to produce information, access information, and share information. In some cases, computing devices can include or correspond to cameras capable of capturing, recording, or acquiring media content, such as images. In some instances, computing devices can view, access, download, and save such media content.

In some cases, a user of a social networking system (or service) can utilize his or her computing device to acquire a media content item, such as an image. The image can, for instance, be acquired or captured via a camera of the computing device. The user may desire to post or share the image via the social networking system. However, the acquired image can be skewed, slanted, or otherwise distorted. As such, the user may desire to edit or modify the image prior to posting or sharing via the social networking system.

In one example, the image can include, represent, or depict a view of the horizon. In this example, the image can be distorted such that the horizon is not horizontal (i.e., substantially horizontal, within an allowable deviation from being horizontal, etc.). Accordingly, the user may desire to edit or modify the perspective of the image, such that the horizon is horizontal. However, conventional approaches to image editing can often times lack certain useful features or tools. Moreover, in some instances, conventional approaches to image editing can cause one or more empty (e.g., black) regions to appear in a resulting edited version of the image.

As such, conventional approaches can be inconvenient, inefficient, and/or otherwise lacking. Therefore, an improved approach can be beneficial for addressing or alleviating various concerns associated with conventional approaches. The disclosed technology can provide image perspective adjustment and automatic fitting. Various embodiments of the present disclosure can provide one or more options to adjust, in a virtual three-dimensional space, an image in an initial perspective. At least a first command, provided based on (i.e., based at least in part on) the one or more options, to adjust the image from the initial perspective into an adjusted perspective can be detected. The image can be adjusted, based on at least the first command, into the adjusted perspective in the virtual three-dimensional space to produce an adjusted image. A second command to modify a viewable area of the adjusted image can be detected. At least a portion of the adjusted image can be automatically fitted, when the second command has ceased, within a specified display area while one or more empty regions can be minimized in the specified display area. It is contemplated that there can be many variations and/or other possibilities.

FIG. 1 illustrates an example system 100 including an example image perspective module 102 configured to facilitate providing image perspective adjustment and automatic fitting, according to an embodiment of the present disclosure. As shown in the example of FIG. 1, the image perspective module 102 can include a perspective adjustment module 104, a viewable area module 106, and an automatic fitting module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the image perspective module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the image perspective module 102 can be implemented, in part or in whole, as software running on one or more computing devices or systems, such as on a user or client computing device. For example, the image perspective module 102 or at least a portion thereof can be implemented as or within an application (e.g., app), a program, or an applet, etc., running on a user computing device or a client computing system, such as the user device 710 of FIG. 7. In another example, the image perspective module 102 or at least a portion thereof can be implemented using one or more computing devices or systems that include one or more servers, such as network servers or cloud servers. In some instances, the image perspective module 102 can, in part or in whole, be implemented within or configured to operate in conjunction with a social networking system (or service), such as the social networking system 730 of FIG. 7. It should be understood that there can be many variations or other possibilities.

The perspective adjustment module 104 can be configured to facilitate providing one or more options to adjust, in a virtual three-dimensional space, an image in an initial perspective. The perspective adjustment module 104 can also be configured to facilitate detecting at least a first command, provided based on the one or more options, to adjust the image from the initial perspective into an adjusted perspective. Furthermore, the perspective adjustment module 104 can be configured to facilitate adjusting, based on (i.e., based at least in part on) at least the first command, the image into the adjusted perspective in the virtual three-dimensional space to produce an adjusted image. More details regarding the facial recognition module 106 will be provided below with reference to FIG. 2A.

The viewable area module 106 can be configured to facilitate detecting a second command to modify a viewable area of the adjusted image. The viewable area module 106 can also be configured to detect if and when the second command has ceased. The second command can, for instance, correspond to a touch gesture. In some embodiments, the touch gesture can include a pinch gesture performed with respect to a touch display of a computing system (or device). The touch display (e.g., touch screen) can be configured to present, at least in part, a specified display area, such as a square-shaped display area. The square-shaped display area can correspond to a portion of the entire display area of the touch display. The viewable area of the adjusted image can be presented within the specified display area.

In some cases, the viewable module 106 can determine that the second command causes the viewable area of the adjusted image to become a zoomed-out viewable area of the adjusted image. For instance, the pinch gesture performed with respect to the touch display can correspond to a pinch-to-zoom-out gesture. Moreover, the viewable area module 106 can be configured to present or display the zoomed-out viewable area of the adjusted image while the second command is detected. The zoomed-out viewable area can, in some cases, reveal one or more empty regions in the specified display area. For example, the zoomed-out viewable area of the adjusted image can appear too small to completely fill the square-shaped display area and thus one or more black regions (or gray regions, darken regions, translucently dark regions, etc.) can appear in the square-shaped display area.

In some instances, the viewable area module 106 can determine that the second command causes the viewable area of the adjusted image to move in at least one of a horizontal direction or a vertical direction, thereby producing a resulting viewable area of the adjusted image. For example, the second command can correspond to at least one touch gesture out of a set of touch gestures. The set of touch gestures can include, but is not limited to, a finger dragging operation, a finger pulling operation, a finger sliding operation, a finger flicking operation, and/or a finger moving operation, etc. The at least one touch gesture can be performed with respect to the touch display. The viewable area module 106 can present the resulting viewable area of the adjusted image while the second command is detected. The resulting viewable area can reveal the one or more empty regions in the specified display area. For example, the resulting viewable area of the adjusted image can be produced from at least a portion of the adjusted image being pulled, dragged, or otherwise moved outside the square-shaped display area, thereby causing one or more black regions to appear where the resulting viewable area of the adjusted image ceases to fill the square-shaped display area.

Moreover, the automatic fitting module 108 can be configured to facilitate automatically fitting, when the second command has ceased, at least a portion of the adjusted image within the specified display area while minimizing one or more empty regions in the specified display area. The automatic fitting module 108 will be discussed in more detail with reference to FIG. 2B.

Furthermore, in some implementations, the image perspective module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the image perspective module 102. For instance, the at least one data store 110 can store information about images as well as edited versions of images. It is contemplated that there can be many variations or other possibilities.

Figure 2A:
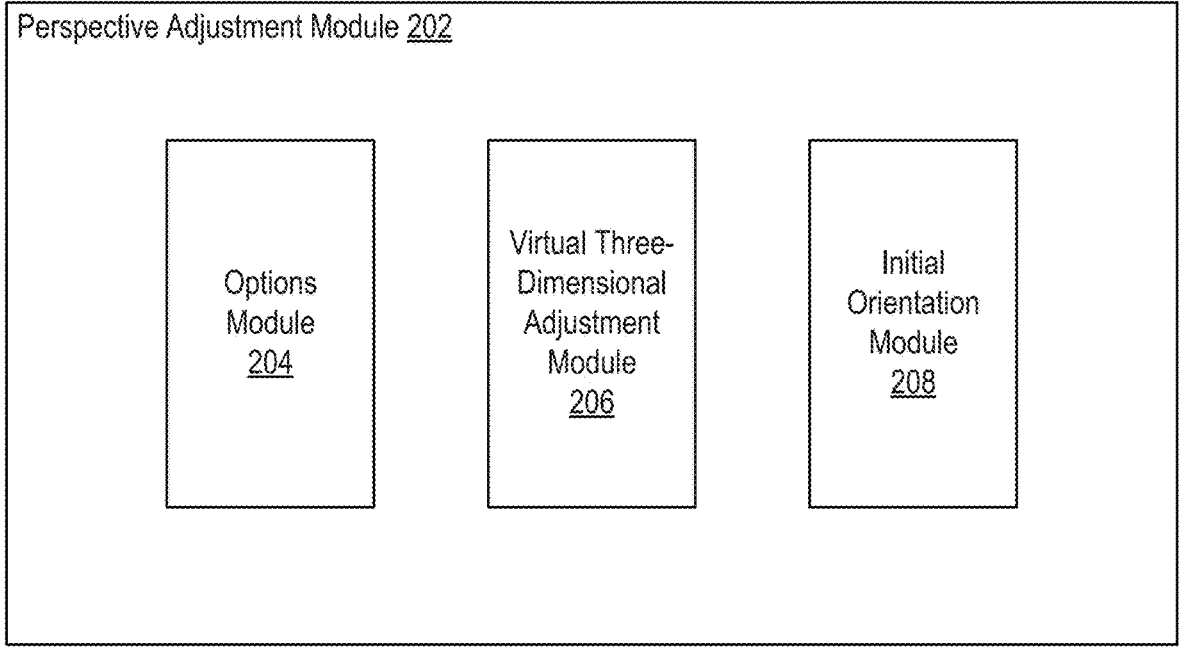
FIG. 2A illustrates an example perspective adjustment module configured to facilitate providing image perspective adjustment and automatic fitting, according to an embodiment of the present disclosure.

FIG. 2A illustrates an example perspective adjustment module 202 configured to facilitate providing image perspective adjustment and automatic fitting, according to an embodiment of the present disclosure. In some embodiments, the perspective adjustment module 104 of FIG. 1 can be implemented as the example perspective adjustment module 202. As shown in FIG. 2A, the perspective adjustment module 202 can include an options module 204, a virtual three-dimensional adjustment module 206, and an initial orientation module 208.

In some implementations, the perspective adjustment module 202 can utilize the options module 204 to provide one or more options to adjust, in a virtual three-dimensional space, an image in an initial perspective. The initial perspective can, for example, be a first point of view in which the image presented, rendered, and/or displayed. The options module 204 can provide at least one of a first option to adjust the image with respect to a horizontal axis in the virtual three-dimensional space, a second option to adjust the image with respect to a vertical axis in the virtual three-dimensional space, or a third option to adjust the image with respect to a depth axis in the virtual three-dimensional space.

The perspective adjustment module 202 can also utilize the options module 204 to detect at least a first command, provided based on the one or more options, to adjust the image from the initial perspective into an adjusted perspective (i.e., to adjust the image from the first perspective into a second perspective, thus resulting in an adjusted image). In one example, a respective slide bar or other input element (or a copy/instance thereof) can be associated with each of the first option, the second option, and the third option. In this example, when a user of a computing system slides or swipes the slide bar (or other input element) for the first option, the image in the first or initial perspective can appear to be rotated, relative to the horizontal axis, into the second or adjusted perspective, resulting in the adjusted image. Similarly, sliding or swiping the slide bar for the second option can cause the image to appear to rotate relative to the vertical axis. Likewise, sliding or swiping the slide bar for the third option can cause the image to rotate relative to the depth axis. In this example, the first command can include the sliding or swiping action(s) performed for the first option, the second option, the third option, and/or any combinations thereof. It should be appreciated that many variations are possible.

Furthermore, the virtual three-dimensional adjustment module 206 can be configured to adjust, based on at least the first command, the image into the adjusted perspective in the virtual three-dimensional space to produce the adjusted image. For example, the virtual three-dimensional adjustment module 206 can provide at least one of a first amount of rotation with respect to the horizontal axis when the first command is directed to the first option, a second amount of rotation with respect to the vertical axis when the first command is directed to the second option, or a third amount of rotation with respect to the depth axis when the first command is directed to the third option. In some embodiments, the virtual three-dimensional adjustment module 206 can utilize one or more image processing techniques, perspective correcting processes, and/or perspective control procedures, etc., to adjust the image into the adjusted perspective, resulting in the adjusted image. It is contemplated that there can be many variations or other possibilities.

Moreover, the adjusting of the image into the adjusted perspective can be dynamically performed in (or near) real-time. As such, the user can view how the adjusted image will appear as the adjustments are being made (e.g., via at least the first command). Also, a plurality of adjustments can be made to the image to produce the adjusted image. Each of the adjustments can be made one after another, without having to save the adjusted image after each adjustment. Again, it should be understood that many variations are possible.

Additionally, in some implementations, the initial orientation module 208 can be configured to facilitate acquiring orientation data from one or more orientation sensors (e.g., gyroscopes, accelerometers, and/or magnetometers, etc.) associated with the computing system. The image can be acquired from a camera of the computing system. The initial orientation module 208 can also be configured to adjust, based on the orientation data, an orientation and a zoom factor of the image to result in the image being in the initial perspective. The image in the initial perspective can be presented in a specified display area of a touch display of the computing system while minimizing one or more empty regions in the specified display area. In some instances, the initial orientation module 208 can determine, based on the orientation data, an amount of rotation in a first direction incurred by the computing system with respect to a default position (e.g., an upright position, a straighten position, etc.). As a result, adjusting the orientation can include rotating the image in a second direction based on the amount of rotation incurred by the computing system. In one example, the second direction can be clockwise relative to the depth axis in the virtual three-dimensional space when the first direction is counterclockwise relative to the depth axis. In another example, the second direction can be counterclockwise relative to the depth axis when the first direction is clockwise relative to the depth axis.

Furthermore, in some embodiments, the initial orientation module 208 can be configured to facilitate analyzing the image to detect one or more linear edges represented in the image. The one or more linear edges can be detected to be within an allowable deviation from being vertical, such as when the linear edges correspond to vertical lines of buildings depicted in the image. The initial orientation module 208 can facilitate adjusting, based on the one or more linear edges, the orientation and the zoom factor of the image to result in the image being in the initial perspective. Again, numerous variations are possible.

Figure 2B:
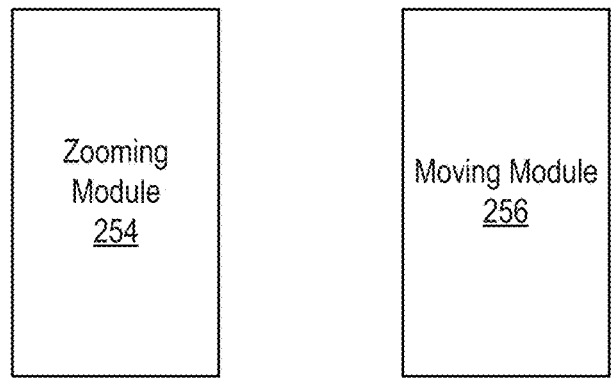
FIG. 2B illustrates an example automatic fitting module configured to facilitate providing image perspective adjustment and automatic fitting, according to an embodiment of the present disclosure.

FIG. 2B illustrates an example automatic fitting module 252 configured to facilitate providing image perspective adjustment and automatic fitting, according to an embodiment of the present disclosure. In some embodiments, the automatic fitting module 108 of FIG. 1 can be implemented as the example automatic fitting module 252. As shown in FIG. 2B, the automatic fitting module 252 can include a zooming module 254 and a moving module 256.

As discussed above, in some cases, it can be determined that the second command causes the viewable area of the adjusted image to become a zoomed-out viewable area of the adjusted image. In some embodiments, the zooming module 254 can be configured to facilitate zooming in the zoomed-out viewable area, when the second command has ceased, such that at least the portion of the adjusted image fills the specified display area and the one or more empty regions (e.g., black regions) are eliminated in the specified display area. For instance, when the second command has been detected to have ceased, the automatic fitting module 252 can utilize the zooming module 254 to automatically fit at least the portion of the adjusted image by zooming in the zoomed-out viewable area. In some cases, the zooming module 254 can determine a minimum amount of zooming in to be applied to the zoomed-out viewable area of the adjusted image in order to maximize a visible or rendered portion of the adjusted image shown in the specified display area (e.g., the square-shaped display area). As a result, at least the portion (e.g., the maximized visible or rendered portion) of the adjusted image can completely fill the specified display area and the one or more empty regions can be eliminated in the specified display area. It should be appreciated that there can be many variations or other possibilities.

In some instances, it can be determined that the second command causes the viewable area of the adjusted image to move in at least one of a horizontal direction or a vertical direction, thereby producing a resulting viewable area of the adjusted image, as discussed previously. In some implementations, the moving module 256 can be configured to facilitate moving the resulting viewable area, when the second command has ceased, such that at least the portion of the adjusted image fills the specified display area and the one or more empty regions are eliminated in the specified display area. For example, when the second command has been detected to have ceased, the automatic fitting module 252 can utilize the moving module 256 to automatically fit at least the portion of the adjusted image by moving the resulting viewable area. In some cases, the moving module 256 can determine a minimum amount of moving to be applied to the resulting viewable area of the adjusted image in order to maximize a visible or rendered portion of the adjusted image shown in the specified display area (e.g., the square-shaped display area). As a result, at least the portion (e.g., the maximized visible or rendered portion) of the adjusted image can completely fill the specified display area and the one or more empty regions can be eliminated in the specified display area. Again, many variations are possible.

Figure 3A:
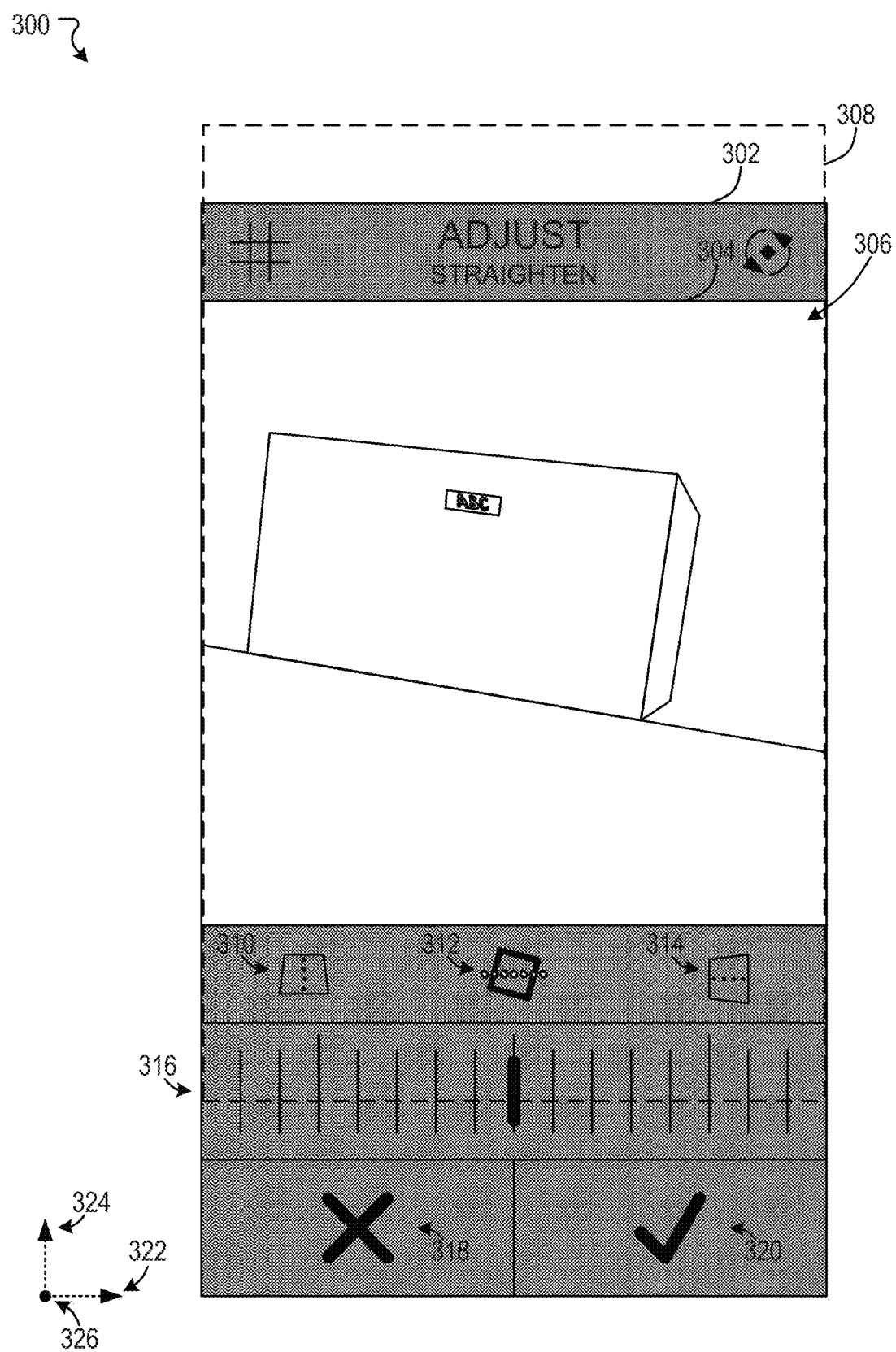
FIG. 3A illustrates an example scenario associated with providing image perspective adjustment and automatic fitting, according to an embodiment of the present disclosure.

FIG. 3A illustrates an example scenario 300 associated with providing image perspective adjustment and automatic fitting, according to an embodiment of the present disclosure. The example scenario 300 illustrates an example screenshot 302 of a computing system (or device) which includes, implements, and/or runs an image perspective module (e.g., the image perspective module 102 of FIG. 1).

The example screenshot 302 can show a specified display area, such as a square-shaped display area 304. The specified display area 304 can present or display a particular portion of an image 306 that is in a first or initial perspective. In this example scenario 300, the actual size of the image 306 can be larger than the particular image portion being presented in the specified display area 304. The actual size of the image 306 can be represented by the dotted boundary line 308.

As shown, the image 306 in the first perspective can be undesirably slanted, tilted, and/or otherwise distorted. One or more options can be provided to adjust the image 306, in a virtual three-dimensional space, from the first perspective into a second or adjusted perspective. For instance, there can be a first option 310, a second option 312, and a third option 314 to adjust the image 306. There can also be a slide bar 316 or other element for receiving inputs to activate, control, select, or otherwise interact with the one or more options. Moreover, there can be a cancel option 318 to cancel one or more adjustments made to the image 306 as well as a confirm option 320 to save and/or process the image 306 with any adjustments.

In some instances, the first option 310 can enable the image 306 to be rotated with respect to a horizontal axis 322 in the virtual three-dimensional space. The second option 312 can enable the image 306 to be rotated with respect to a vertical axis 324 in the virtual three-dimensional space. The third option 314 can enable the image 306 to be rotated with respect to a depth axis 326 in the virtual three-dimensional space. It should be understood that the examples herein are provided for illustrative purposes and that many variations are possible.

Figure 3B:
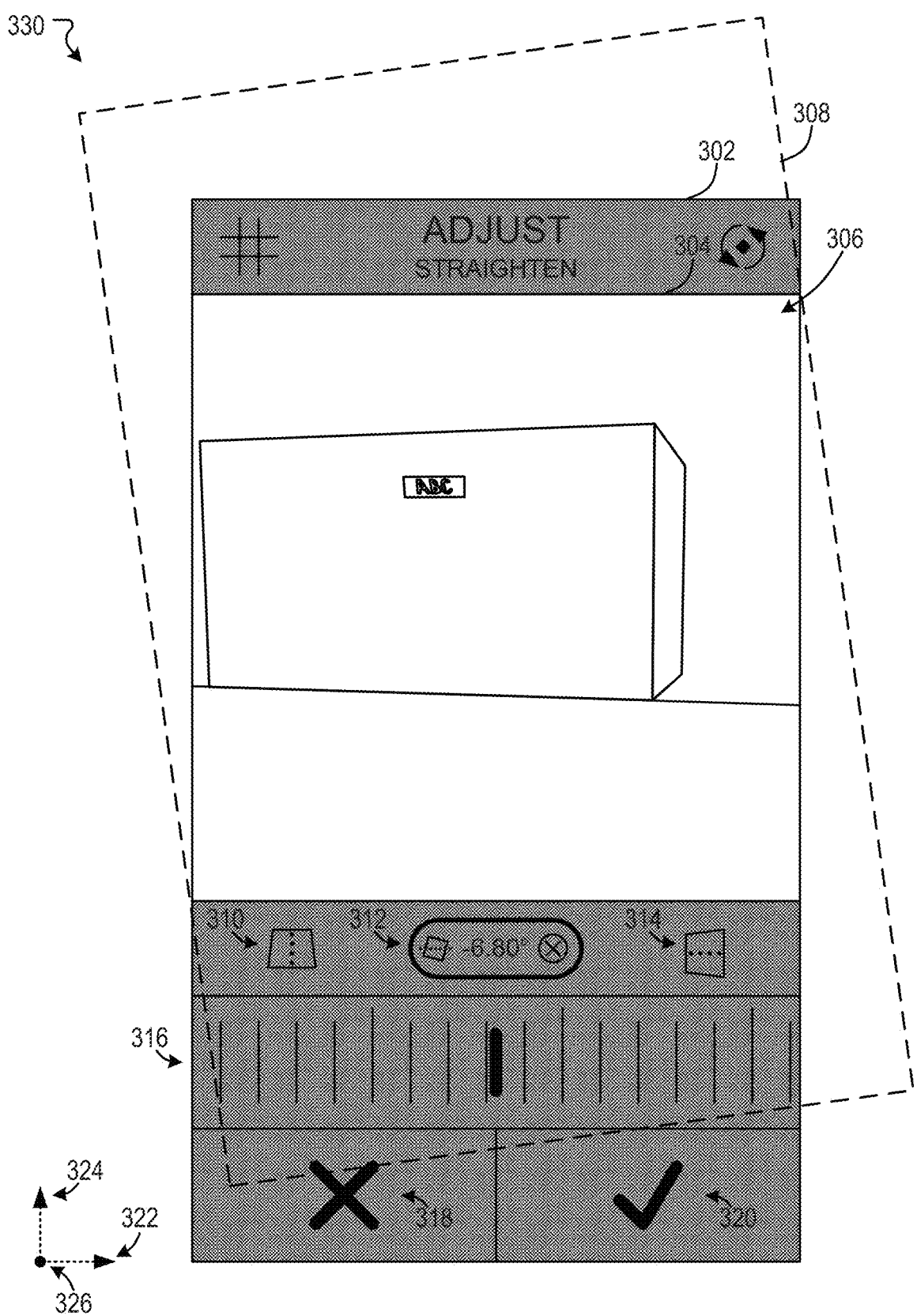
FIG. 3B illustrates an example scenario associated with providing image perspective adjustment and automatic fitting, according to an embodiment of the present disclosure.

FIG. 3B illustrates an example scenario 330 associated with providing image perspective adjustment and automatic fitting, according to an embodiment of the present disclosure. In the example scenario 330, the image 306 in FIG. 3A has been rotated counterclockwise with respect to the depth axis 326 in the virtual three-dimensional space. For instance, a user of the computing system can select the second option 312 and interact with the slide bar 316 to make such a straightening rotation relative to the depth axis 326. The amount (e.g., degree) of rotation can also be determined or calculated and then provided or indicated in association with the second option 312. Moreover, the disclosed technology can zoom in with respect to the image 306 such that the specified display area 304 is completely filled by the image 306.

Figure 3C:
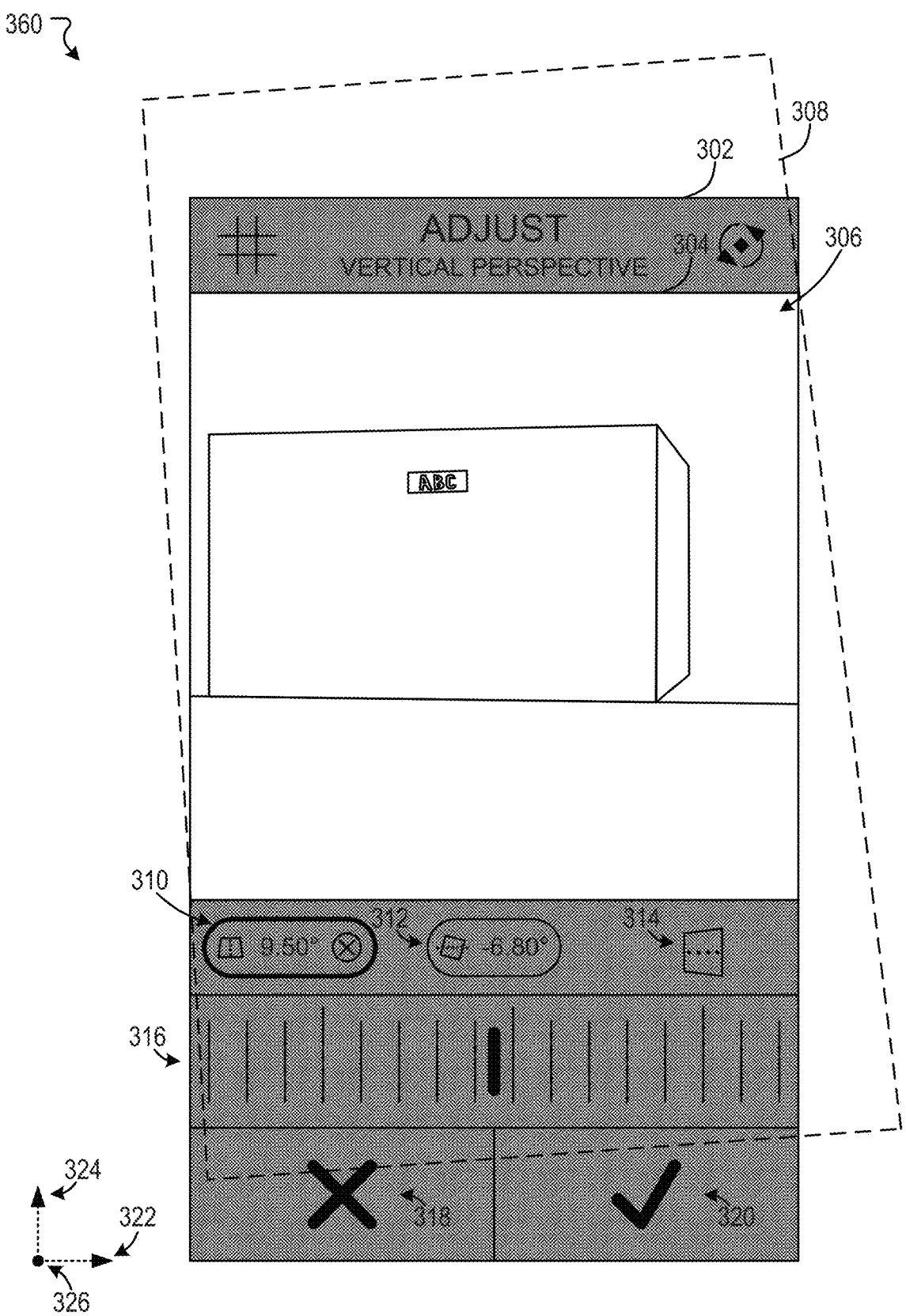
FIG. 3C illustrates an example scenario associated with providing image perspective adjustment and automatic fitting, according to an embodiment of the present disclosure.

FIG. 3C illustrates an example scenario 360 associated with providing image perspective adjustment and automatic fitting, according to an embodiment of the present disclosure. In the example scenario 360, the image 306 in FIG. 3B has been rotated with respect to the horizontal axis 322 in the virtual three-dimensional space. For instance, the user can select the first option 310 and interact with the slide bar 316 to make such a vertical perspective rotation relative to the horizontal axis 322. The amount of rotation can also be determined and then provided in association with the first option 310. Further, the disclosed technology can cause the specified display area 304 to be completely filled by the image 306.

Figure 3D:
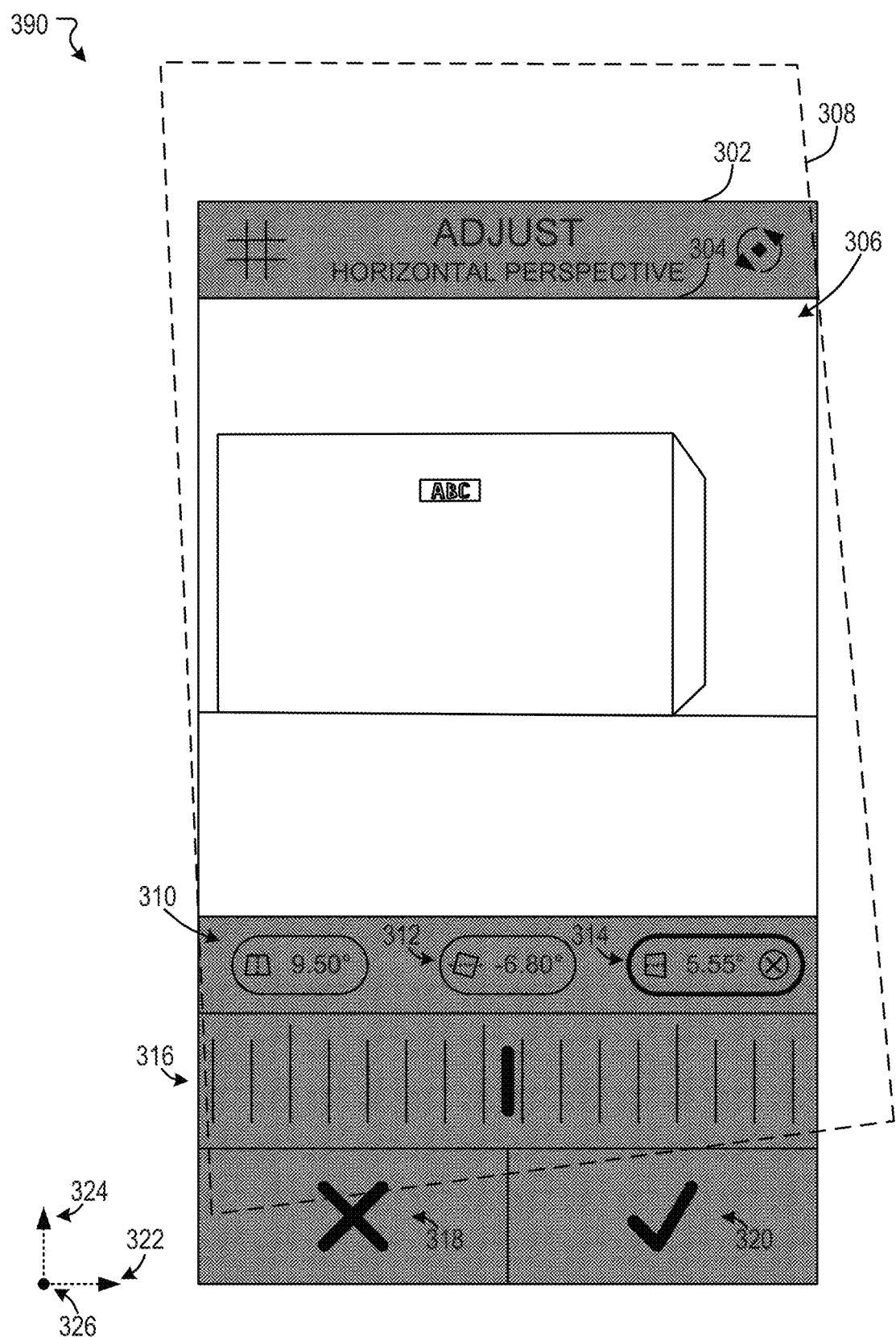
FIG. 3D illustrates an example scenario associated with providing image perspective adjustment and automatic fitting, according to an embodiment of the present disclosure.

FIG. 3D illustrates an example scenario 390 associated with providing image perspective adjustment and automatic fitting, according to an embodiment of the present disclosure. In the example scenario 390, the image 306 in FIG. 3C has been rotated with respect to the vertical axis 324 in the virtual three-dimensional space. For instance, the user can select the third option 314 and interact with the slide bar 316 to make such a horizontal perspective rotation relative to the vertical axis 324. The amount of rotation can also be determined and then provided in association with the third option 314. As discussed, the specified display area 304 can be completely filled by the image 306. It is contemplated that many variations are possible.

Figure 4A:
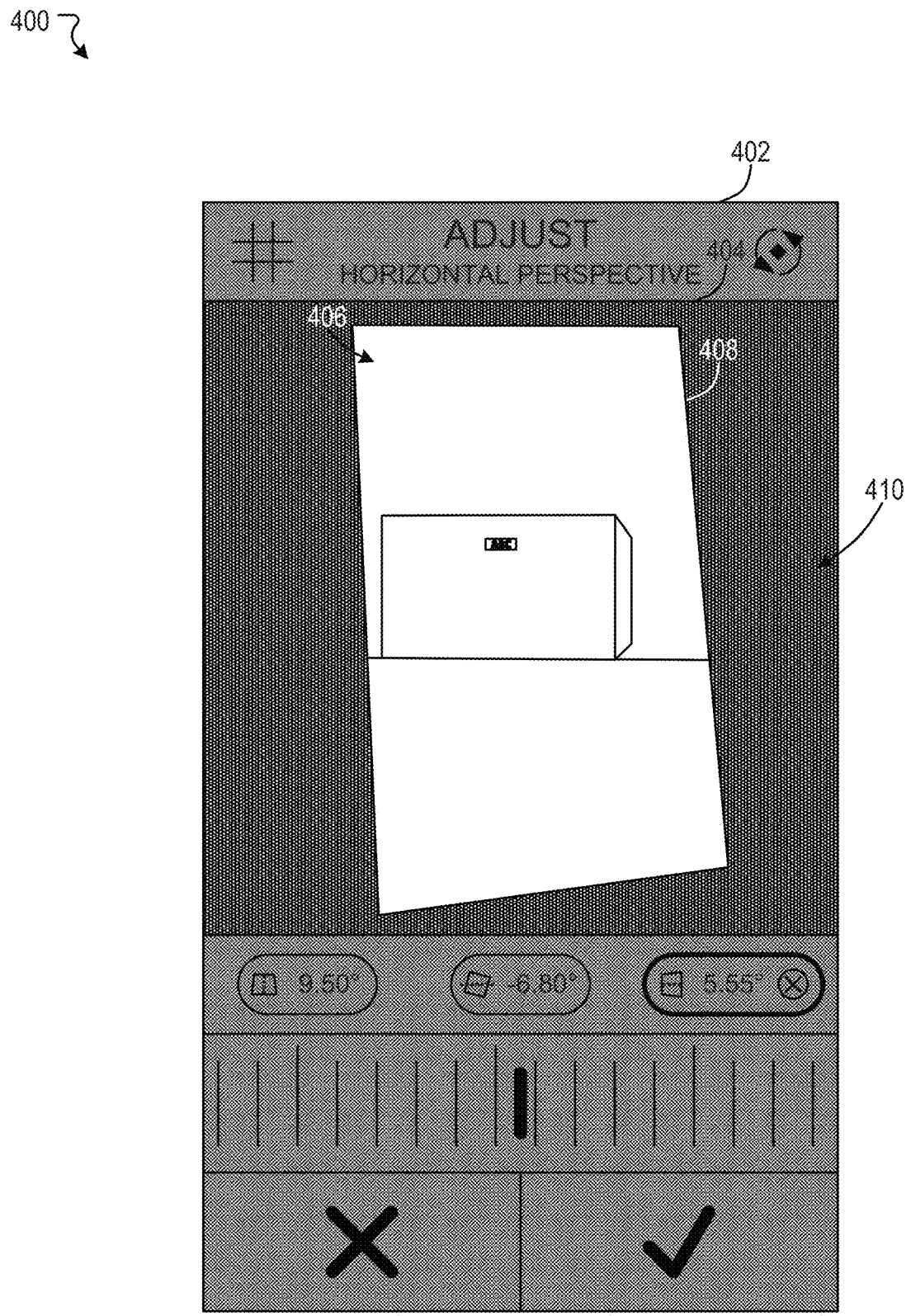
FIG. 4A illustrates an example scenario associated with providing image perspective adjustment and automatic fitting, according to an embodiment of the present disclosure.

FIG. 4A illustrates an example scenario 400 associated with providing image perspective adjustment and automatic fitting, according to an embodiment of the present disclosure. The example scenario 400 illustrates an example screenshot 402. The example screenshot 402 shows a specified display area 404 which presents or displays an image 406 in an adjusted perspective. In the example screenshot 402, a user can perform a command, such as a zoom-out pinch touch gesture, that causes the specified display area 404 to present or display a zoomed-out viewable area of the image 406. The border of the zoomed-out image 406 can be shown via boundary line 408. As shown, this can reveal one or more empty regions 410 in the specified display area 404.

Figure 4B:
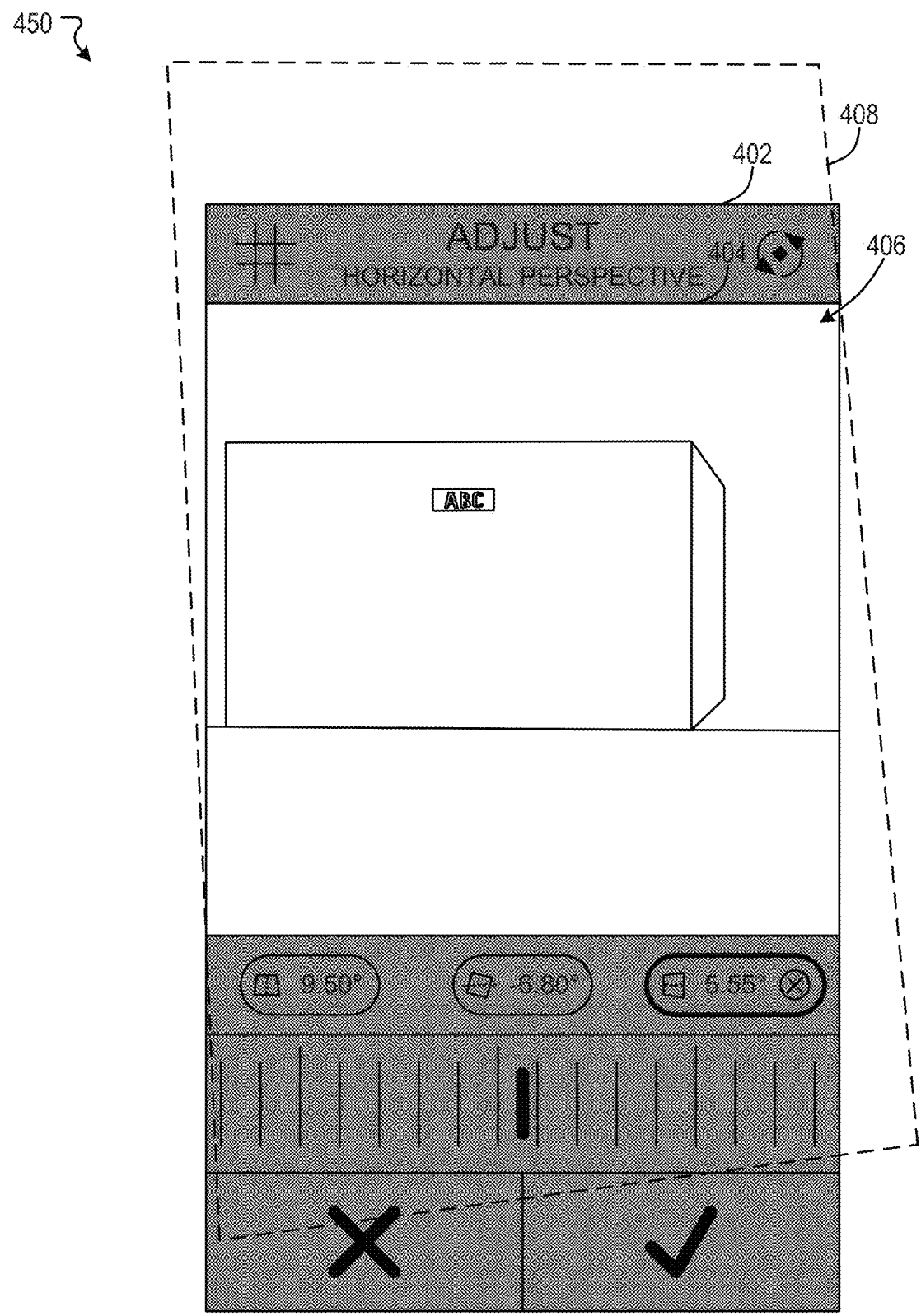
FIG. 4B illustrates an example scenario associated with providing image perspective adjustment and automatic fitting, according to an embodiment of the present disclosure.

FIG. 4B illustrates an example scenario 450 associated with providing image perspective adjustment and automatic fitting, according to an embodiment of the present disclosure. In the example scenario 450, the disclosed technology can automatically fit the image 406 of FIG. 4A when the zoom-out pinch touch gesture has ceased. The disclosed technology can provide an animation that zooms in the image 306 such that specified display area 304 is completely filled by the image 306 and the empty regions are eliminated. Again, many variations are possible.

Figure 5A:
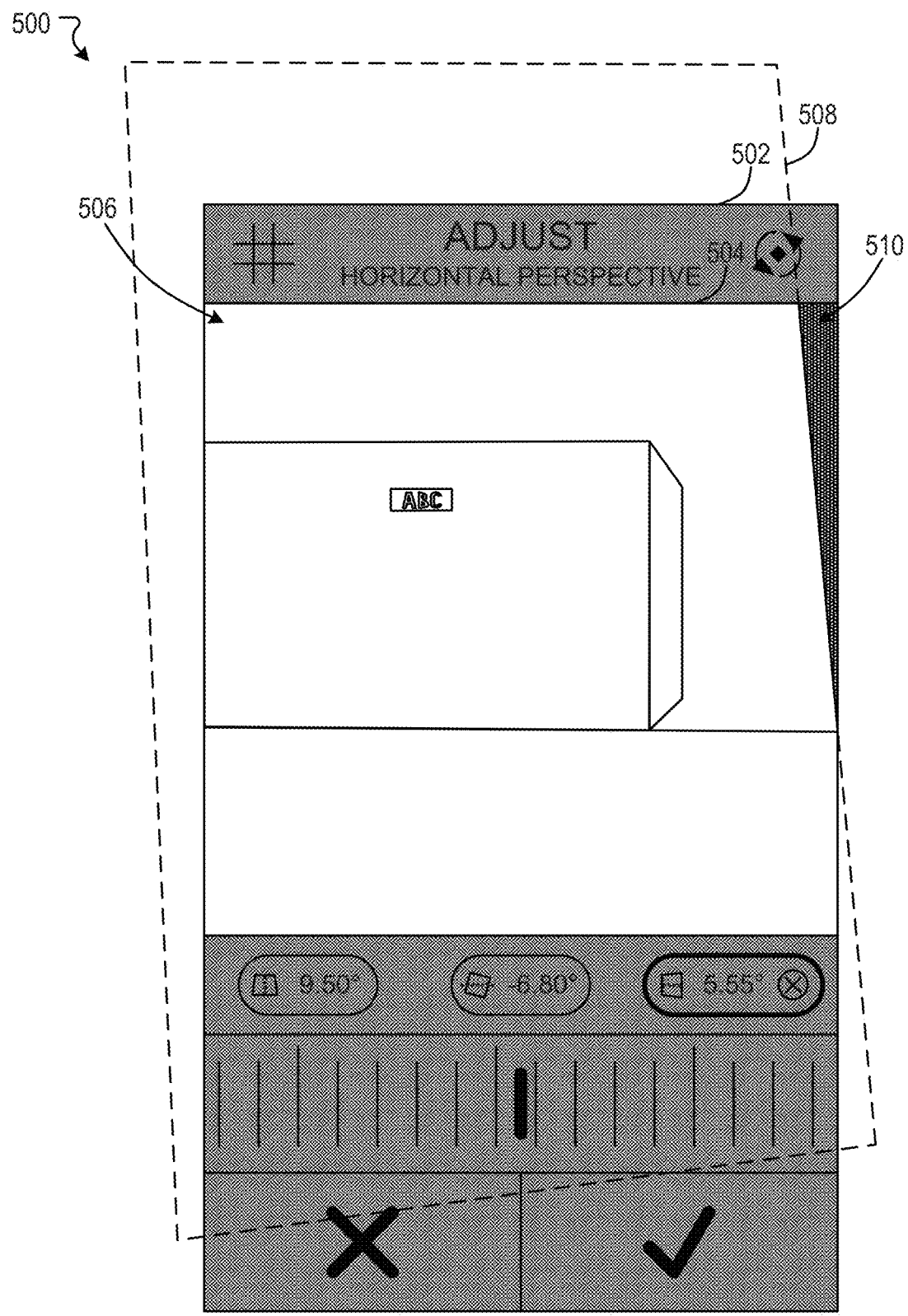
FIG. 5A illustrates an example scenario associated with providing image perspective adjustment and automatic fitting, according to an embodiment of the present disclosure.

FIG. 5A illustrates an example scenario 500 associated with providing image perspective adjustment and automatic fitting, according to an embodiment of the present disclosure. The example scenario 500 illustrates an example screenshot 502. The example screenshot 502 shows a specified display area 504 which presents or displays an image 506 in an adjusted perspective. In the example screenshot 502, a user can perform a command, such as a finger moving or dragging touch gesture, that causes the specified display area 504 to present or display a resulting viewable area of the image 506. The border of the moved image 506 can be shown via boundary line 508. As shown, this can reveal one or more empty regions 510 in the specified display area 504.

Figure 5B:
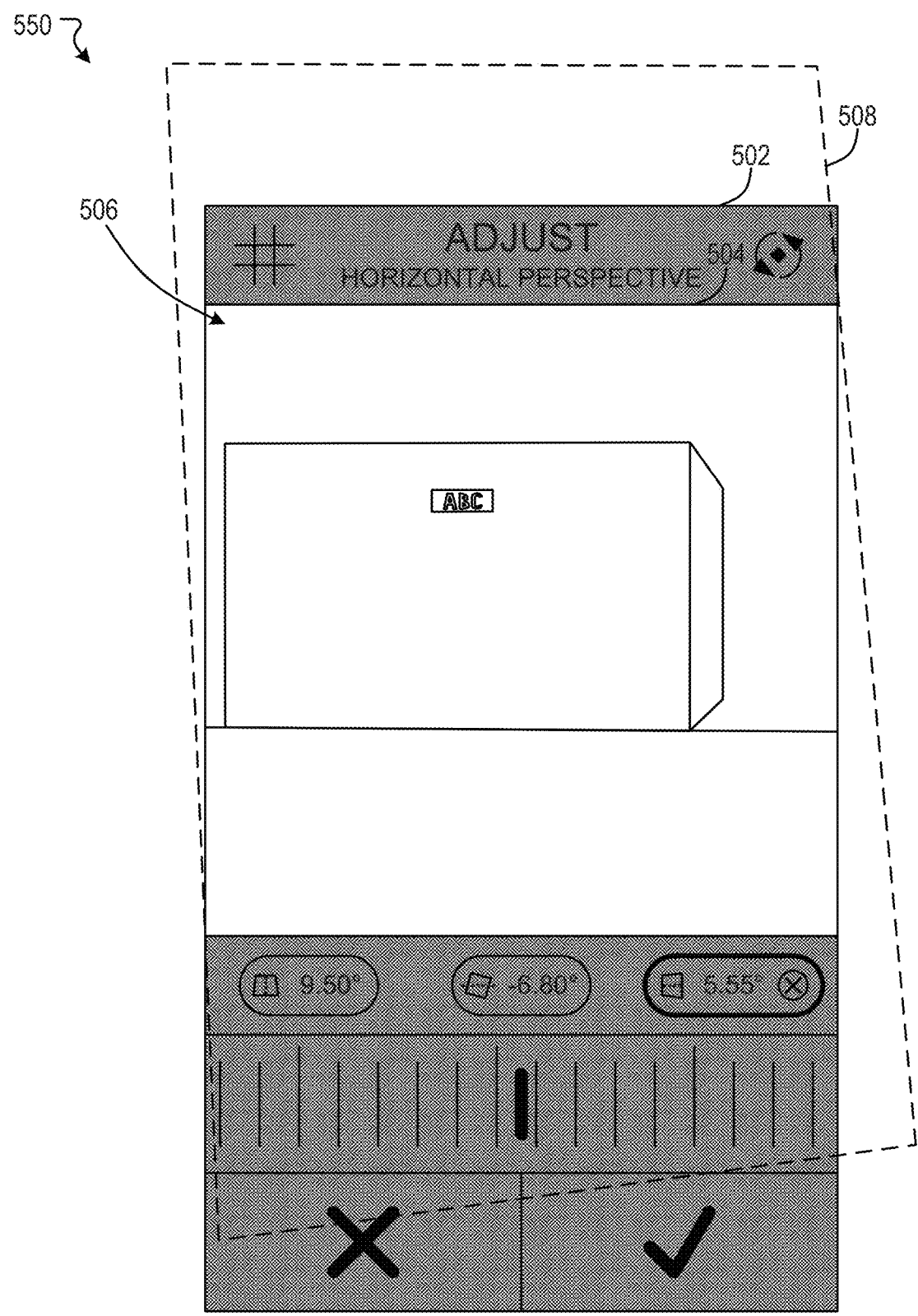
FIG. 5B illustrates an example scenario associated with providing image perspective adjustment and automatic fitting, according to an embodiment of the present disclosure.

FIG. 5B illustrates an example scenario 550 associated with providing image perspective adjustment and automatic fitting, according to an embodiment of the present disclosure. In the example scenario 550, the disclosed technology can automatically fit the image 506 of FIG. 5A when the finger moving or dragging touch gesture has ceased. The disclosed technology can provide an animation that moves, slings, or flings the image 406 such that specified display area 404 is completely filled by the image 406 and the empty regions are eliminated. As discussed, many variations are possible.

Figure 6A:
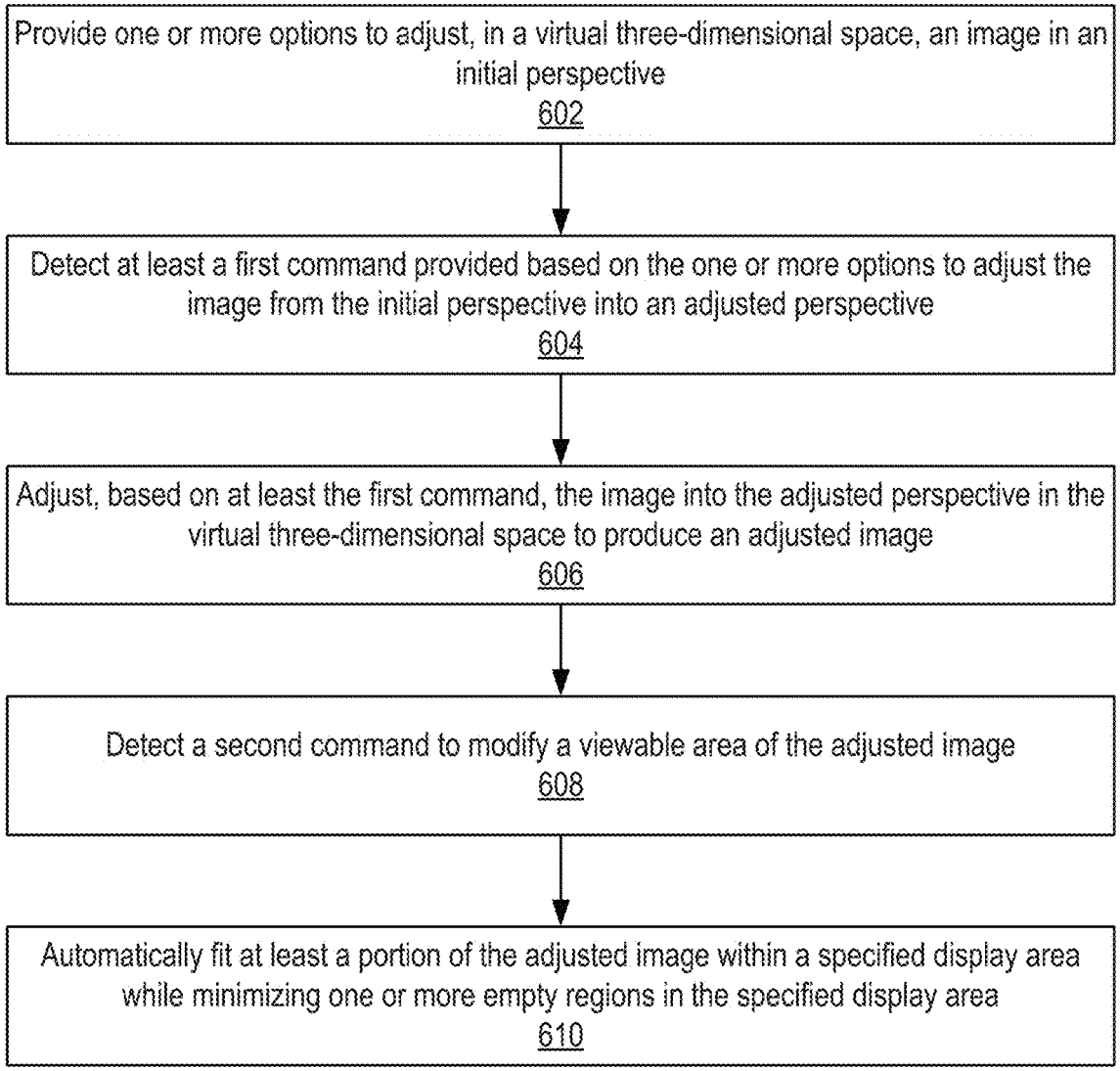
FIG. 6A illustrates an example method associated with providing image perspective adjustment and automatic fitting, according to an embodiment of the present disclosure.

FIG. 6A illustrates an example method 600 associated with providing image perspective adjustment and automatic fitting, according to an embodiment of the present disclosure. It should be appreciated that there can be additional, fewer, or alternative steps performed in similar or alternative orders, or in parallel, within the scope of the various embodiments unless otherwise stated.

At block 602, the example method 600 can provide one or more options to adjust, in a virtual three-dimensional space, an image in an initial perspective. At block 604, the example method 600 can detect at least a first command, provided based on the one or more options, to adjust the image from the initial perspective into an adjusted perspective. At block 606, the example method 600 can adjust, based on at least the first command, the image into the adjusted perspective in the virtual three-dimensional space to produce an adjusted image. At block 608, the example method 600 can detect a second command to modify a viewable area of the adjusted image. At block 610, the example method 600 can automatically fit, when the second command has ceased, at least a portion of the adjusted image within a specified display area while minimizing one or more empty regions in the specified display area.

Figure 6B:
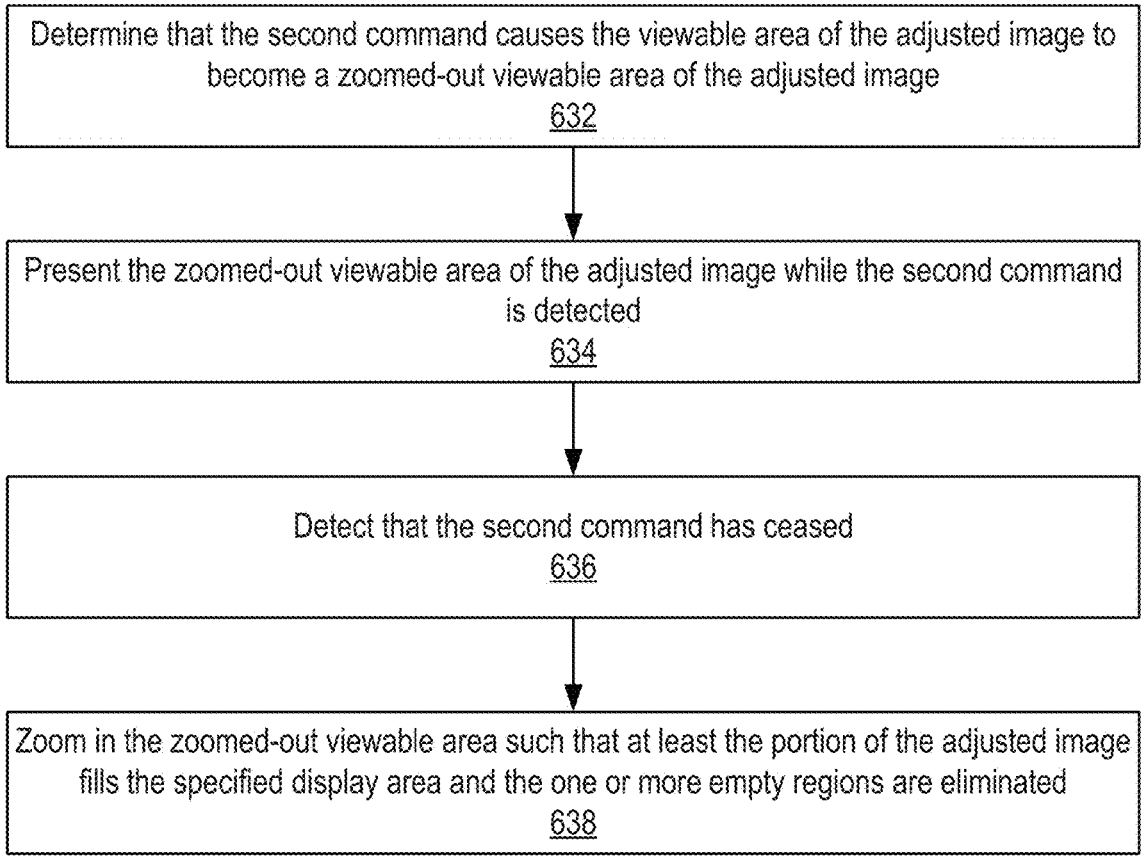
FIG. 6B illustrates an example method associated with providing image perspective adjustment and automatic fitting, according to an embodiment of the present disclosure.

FIG. 6B illustrates an example method 630 associated with providing image perspective adjustment and automatic fitting, according to an embodiment of the present disclosure. Again, it should be appreciated that there can be additional, fewer, or alternative steps performed in similar or alternative orders, or in parallel, within the scope of the various embodiments unless otherwise stated.

At block 632, the example method 630 can determine that the second command causes the viewable area of the adjusted image to become a zoomed-out viewable area of the adjusted image. At block 634, the example method 630 can present the zoomed-out viewable area of the adjusted image while the second command is detected. The zoomed-out viewable area can reveal the one or more empty regions in the specified display area. At block 636, the example method 630 can detect that the second command has ceased. At block 638, the example method 630 can zoom in the zoomed-out viewable area such that at least the portion of the adjusted image fills the specified display area and the one or more empty regions are eliminated in the specified display area.

Figure 6C:
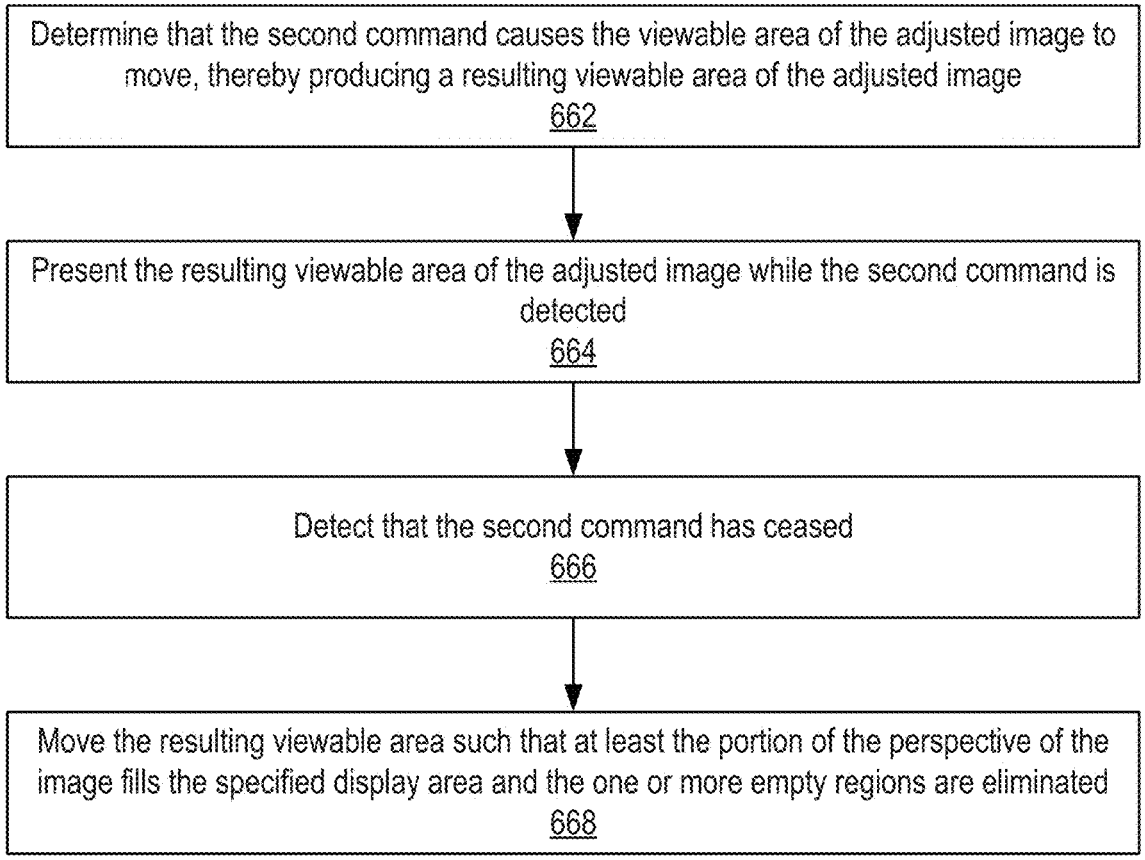
FIG. 6C illustrates an example method associated with providing image perspective adjustment and automatic fitting, according to an embodiment of the present disclosure.

FIG. 6C illustrates an example method 660 associated providing image perspective adjustment and automatic fitting, according to an embodiment of the present disclosure. Again, it should be appreciated that there can be additional, fewer, or alternative steps performed in similar or alternative orders, or in parallel, within the scope of the various embodiments unless otherwise stated.

At block 662, the example method 660 can determine that the second command causes the viewable area of the adjusted image to move in at least one of a horizontal direction or a vertical direction, thereby producing a resulting viewable area of the adjusted image. At block 664, the example method 660 can present the resulting viewable area of the adjusted image while the second command is detected. The resulting viewable area can reveal the one or more empty regions in the specified display area. At block 666, the example method 660 can detect that the second command has ceased. At block 668, the example method 660 can move the resulting viewable area such that at least the portion of the adjusted image fills the specified display area and the one or more empty regions are eliminated in the specified display area.

In some embodiments, adjustments made to the image can be finalized and the adjusted image can be processed and rendered in high quality. In some embodiments, an option to cancel a current edit or adjustment can be provided. In some implementations, an option to clear all edits or adjustments can be provided. In some embodiments, one or more image filters can be applied to the adjusted image.

It is contemplated that there can be many other uses, applications, features, possibilities, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 7:
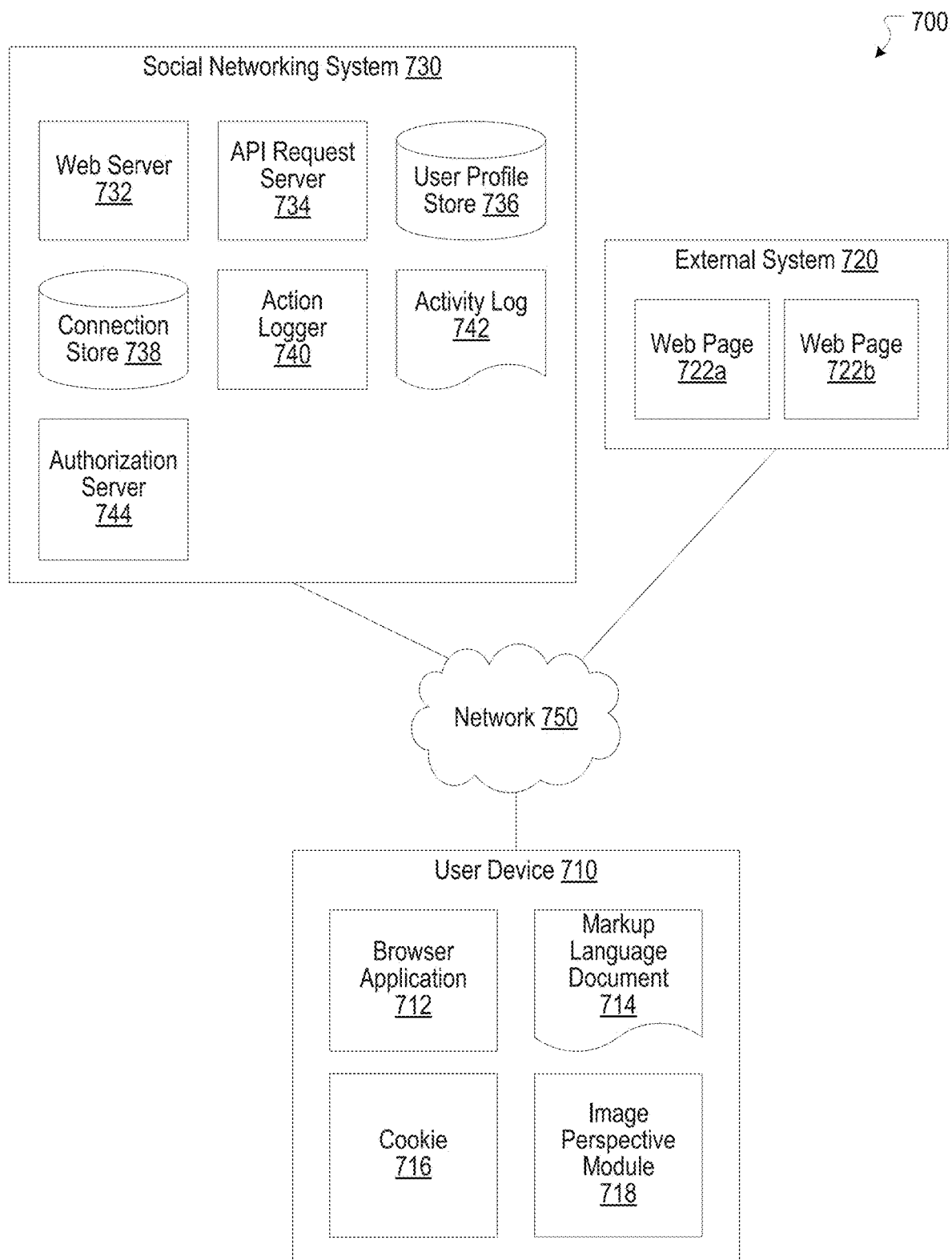
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the user device 710 can include an image perspective module 718. The image perspective module 718 can, for example, be implemented as the image perspective module 102 of FIG. 1. As discussed previously, it should be appreciated that there can be many variations or other possibilities. For example, in some instances, the image perspective module 718 (or at least a portion thereof) can be included in the social networking system 730. Other features of the image perspective module 718 are discussed herein in connection with the image perspective module 102.

Hardware Implementation

Figure 8:
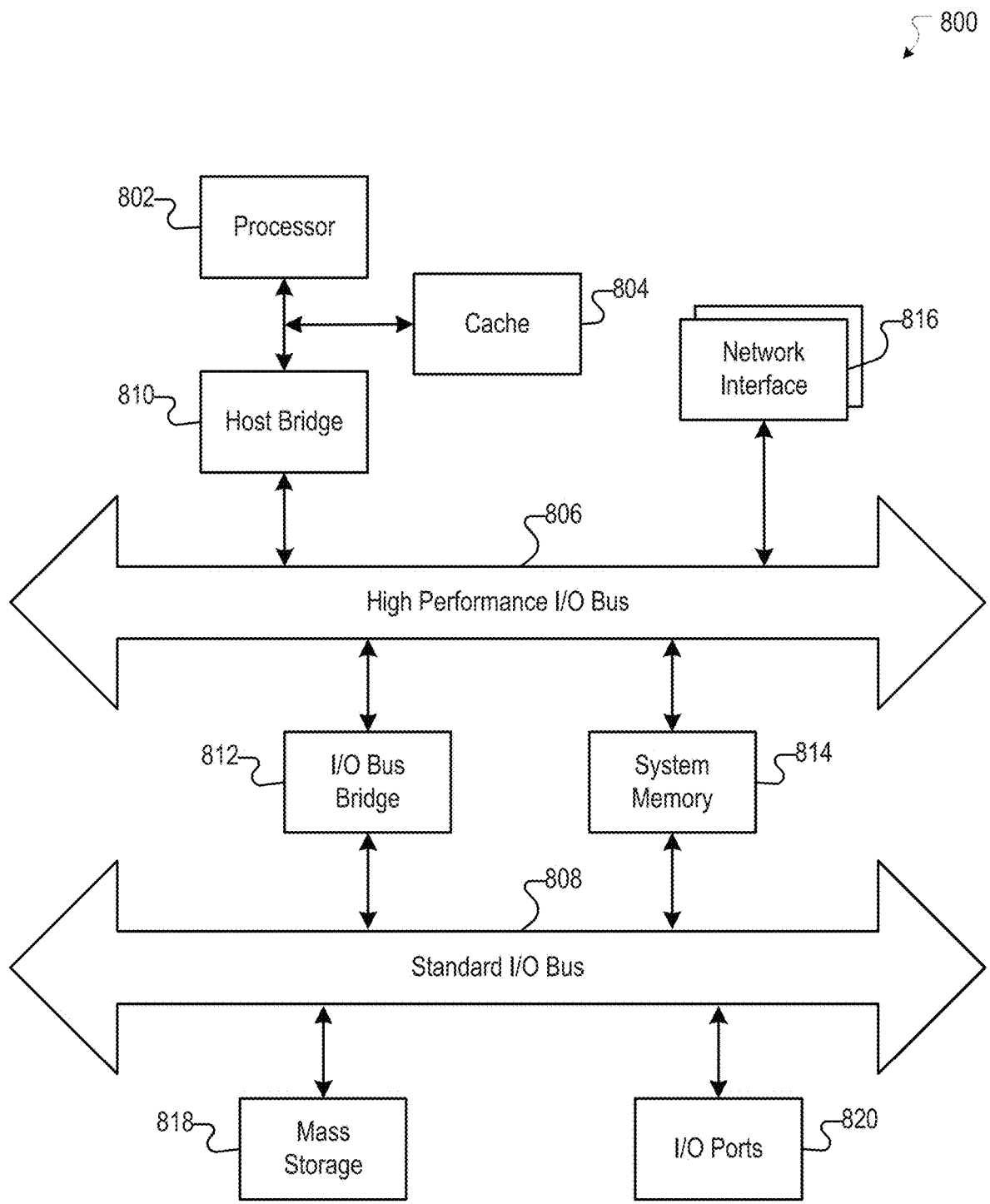
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
adjusting, by a computing system, an image in a display area to produce an adjusted image, wherein the adjusting reveals one or more empty regions indicated by at least one edge of the adjusted image that is not parallel to at least one edge of the display area and the adjusting results in a portion of the adjusted image outside the display area;

determining, by the computing system, at least one of: a minimum amount of zooming or a minimum amount of moving to apply to the adjusted image to fill the display area with the portion of the adjusted image outside the display area to minimize the one or more empty regions, and to minimize the at least one edge of the adjusted image; and based on the determining, automatically fitting, by the computing system, at least a portion of the adjusted image to fill the display area while generating an animation of zooming or moving the adjusted image.

2. The computer-implemented method of claim 1, further comprising:

providing, by the computing system, one or more options to adjust the image in a virtual three-dimensional space;

detecting, by the computing system, a command to adjust the image; and wherein the adjusted image is produced based at least in part on the command.

3. The computer-implemented method of claim 2, wherein the one or more options to adjust the image comprises at least one of: a first option to adjust the image with respect to a horizontal axis in the virtual three-dimensional space, a second option to adjust the image with respect to a vertical axis in the virtual three-dimensional space, or a third option to adjust the image with respect to a depth axis in the virtual three-dimensional space.

4. The computer-implemented method of claim 1, further comprising:

providing, by the computing system, one or more options to adjust a viewable area of the image;

detecting, by the computing system, a command to adjust the viewable area; and wherein the adjusted image is produced based at least in part on the command.

5. The computer-implemented method of claim 4, wherein the one or more options to adjust the viewable area comprises at least one of: a first option to adjust the viewable area in a horizontal direction, a second option to adjust the viewable area in a vertical direction, or a third option to adjust the viewable area by zooming.

6. The computer-implemented method of claim 1, further comprising:

acquiring, by the computing system, a first orientation data associated with a default position;

acquiring, by the computing system, a second orientation data associated with the image;

determining, by the computing system, an amount of rotation in a first direction based on the first orientation data and the second orientation data; and wherein the adjusted image is produced based at least in part on the amount of rotation and the first direction.

7. The computer-implemented method of claim 6, wherein the first orientation data and the second orientation data are acquired from one or more orientation sensors associated with a camera that acquired the image.

8. The computer-implemented method of claim 6, wherein producing the adjusted image comprises rotating the image in a second direction opposite the first direction by the amount of rotation.

9. The computer-implemented method of claim 1, further comprising:

detecting, by the computing system, one or more linear edges represented in the image;

determining, by the computing system, an orientation and a zoom factor of the image to result in the one or more linear edges to be within an allowable deviation from being vertical or horizontal; and wherein the adjusted image is produced based at least in part on the orientation and the zoom factor.

10. The computer-implemented method of claim 1, wherein the adjusted image is produced based at least in part on one or more touch gestures.

11. A system comprising:

at least one processor; and a memory storing instructions that, when executed by the at least one processor, cause the system to perform:

adjusting an image in a display area to produce an adjusted image, wherein the adjusting reveals one or more empty regions indicated by at least one edge of the adjusted image that is not parallel to at least one edge of the display area and the adjusting results in a portion of the adjusted image outside the display area;

determining at least one of: a minimum amount of zooming or a minimum amount of moving to apply to the adjusted image to fill the display area with the portion of the adjusted image outside the display area to minimize the one or more empty regions, and to minimize the at least one edge of the adjusted image; and based on the determining, automatically fitting at least a portion of the adjusted image to fill the display area while generating an animation of zooming or moving the adjusted image.

12. The system of claim 11, further comprising:

providing one or more options to adjust the image in a virtual three-dimensional space;

detecting a command to adjust the image; and wherein the adjusted image is produced based at least in part on the command.

13. The system of claim 12, wherein the one or more options to adjust the image comprises at least one of: a first option to adjust the image with respect to a horizontal axis in the virtual three-dimensional space, a second option to adjust the image with respect to a vertical axis in the virtual three-dimensional space, or a third option to adjust the image with respect to a depth axis in the virtual three-dimensional space.

14. The system of claim 11, further comprising:

providing one or more options to adjust a viewable area of the image;

detecting a command to adjust the viewable area; and wherein the adjusted image is produced based at least in part on the command.

15. The system of claim 14, wherein the one or more options to adjust the viewable area comprises at least one of: a first option to adjust the viewable area in a horizontal direction, a second option to adjust the viewable area in a vertical direction, or a third option to adjust the viewable area by zooming.

16. A non-transitory computer-readable storage medium including instructions that, when executed by at least one processor of a computing system, cause the computing system to perform:

adjusting an image in a display area to produce an adjusted image, wherein the adjusting reveals one or more empty regions indicated by at least one edge of the adjusted image that is not parallel to at least one edge of the display area and the adjusting results in a portion of the adjusted image outside the display area;

determining at least one of: a minimum amount of zooming or a minimum amount of moving to apply to the adjusted image to fill the display area with the portion of the adjusted image outside the display area to minimize the one or more empty regions, and to minimize the at least one edge of the adjusted image; and based on the determining, automatically fitting at least a portion of the adjusted image to fill the display area while generating an animation of zooming or moving the adjusted image.

17. The non-transitory computer-readable storage medium of claim 16, further comprising:

providing one or more options to adjust the image in a virtual three-dimensional space;

detecting a command to adjust the image; and wherein the adjusted image is produced based at least in part on the command.

18. The non-transitory computer-readable storage medium of claim 17, wherein the one or more options to adjust the image comprises at least one of: a first option to adjust the image with respect to a horizontal axis in the virtual three-dimensional space, a second option to adjust the image with respect to a vertical axis in the virtual three-dimensional space, or a third option to adjust the image with respect to a depth axis in the virtual three-dimensional space.

19. The non-transitory computer-readable storage medium of claim 16, further comprising:

providing one or more options to adjust a viewable area of the image;

detecting a command to adjust the viewable area; and wherein the adjusted image is produced based at least in part on the command.

20. The non-transitory computer-readable storage medium of claim 19, wherein the one or more options to adjust the viewable area comprises at least one of: a first option to adjust the viewable area in a horizontal direction, a second option to adjust the viewable area in a vertical direction, or a third option to adjust the viewable area by zooming.

\* \* \* \* \*